3,449,265
CRACKING CATALYST COMPOSITIONS
Elroy Merle Gladrow and Charles Newton Kimberlin, Jr., Baton Rouge, La., assignors to Esso Research and Engineering Company, a corporation of Delaware
No Drawing. Continuation-in-part of application Ser. No. 490,116, Sept. 24, 1965. This application Aug. 14, 1968, Ser. No. 752,501
Int. Cl. B01j *11/40;* C10g *11/04*
U.S. Cl. 252—455                    17 Claims

ABSTRACT OF THE DISCLOSURE

The present disclosure relates to improved catalyst compositions useful in hydrocarbon conversion reactions. Broadly, the catalyst comprises from 3 to 15 wt. percent of a cation exchanged crystalline alumino-silicate zeolite embedded in a matrix consisting of from about 1 to 50 wt. percent of a clay, and from 96 to 35 wt. percent of a silica-alumina hydrogel. In a preferred embodiment, the clay concentration will range between about 25 and 50 wt. percent, and in a most preferred embodiment, the clay concentration will range between 32 and 40 wt. percent. The crystalline zeolite component of the catalyst may be ion exchanged to form the hydrogen, magnesium or calcium forms of the catalyst. The catalyst compositions disclosed herein exhibit improved stability and selectivity when compared to prior art catalyst compositions in a cracking operation.

Background

This application is a continuation-in-part of U.S. application Ser. No. 490,116, which was filed on Sept. 24, 1965 and now abandoned.

The present invention relates to improved hydrocarbon conversion catalyst compositions, methods for their preparation and uses thereof in hydrocarbon conversion processes. More particularly, the present invention relates to catalyst compositions comprising a crystalline alumino-silicate zeolite in a physical admixture with a matrix comprising a clay. Still more particularly, the present invention relates to a catalyst composition comprising a crystalline alumino-silicate zeolite in admixture with an amorphous silica-alumina component and a clay.

The catalytic treatment of hydrocarbons, particularly those derived from petroleum feed stocks, has seen great improvement in the past several years. For example, the early clay catalysts were replaced by synthetic, amorphous, silica-alumina composite catalyst which afforded significant improvements in activity, selectivity, stability, and attrition. More recently, however, even further improvements have been made with the introduction of crystalline, alumino-silicate zeolites which exhibit very much greater activity and selectivity toward hydrocarbon conversion reactions than the amorphous silica-alumina catalyst.

Crystalline alumino-silicate zeolites, which are commonly referred to as "molecular sieves," are well known in the art. They are characterized by their highly ordered crystalline structure in uniformly dimensioned pores, and are distinguishable from each other on the basis of composition, crystalline structure, adsorption properties, and the like. The term "molecular sieves" is derived from the ability of these zeolite materials to selectively adsorb molecules on the basis of their size and form. The various types of molecular sieves may be classified according to the size of the molecules which will be rejected (not adsorbed) by a particular sieve. A number of these zeolite materials are described, for example, in U.S. Patents 3,013,982–86, wherein they are characterized by their composition and X-ray diffraction characteristics. In addition to their extensive use as adsorbents for hydrocarbon separation processes and the like, it has recently been found that crystalline alumino-silicate zeolites, particularly after cation exchange to reduce alkali metal oxide content, are valuable catalytic materials for various processes, particularly hydrocarbon conversion processes.

In general, the chemical formula of anhydrous crystalline alumino-silicate zeolites expressed in terms of moles may be generally represented as:

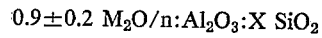

$$0.9 \pm 0.2\ M_2O/n:Al_2O_3:X\ SiO_2$$

wherein M is selected from the group consisting of hydrogen, monovalent and divalent metal cations and mixtures thereof; $n$ is its valence, and X is a number from about 1.5 to about 12, said value dependent upon the particular type of zeolite. The zeolite, as produced or found naturally, normally contains an alkali metal such as sodium or an alkaline earth metal such as calcium. Among the well-known natural zeolites are mordenite, faujasite, chabazite, gmelinite, analcite, erionite, etc. Such zeolites differ in structure, composition, and particularly in the ratio of silica to alumina contained in the crystal lattice structure. Similarly, the various types of synthetic crystalline zeolites, e.g., synthetic faujasite, mordenite, etc., will also have varying silica-to-alumina ratios depending upon such variables as composition of the crystallization mixture, reaction conditions, etc.

For use in hydrocarbon conversion processes, the higher silica-to-alumina zeolites will be preferred because of their higher stability at elevated temperatures. Therefore, whereas the present invention contemplates the use use of zeolites in general, those having silica-to-alumina mole ratios above about 3 will be preferred. Typical among these is the synthetic faujasite variety, wherein X in the above formula is about 3 to 7, preferably 3 to 6, and most preferably 4 to 5.5; and the synthetic mordenite variety, wherein X is about 8 to 12, preferably 9.5 to 10.5. To be suitable as catalysts they should have uniform pore diameters of about 6 to about 15 A., preferably 10 to 13° A. A conventional scheme for preparing sodium synthetic faujasite is as follows:

Colloidal silica or silica hydrosol is mixed with a solution of sodium hydroxide and sodium aluminate at ambient temperature. Suitable reactant molar ratios are within the following ranges: $Na_2O/SiO_2$, 0.28 to 0.80; $SiO_2/Al_2O_3$, 7 to 40; $H_2O/Na_2O$, 20 to 60. In order to aid crystallization, the reaction mixture may be either digested at ambient temperature for up to 40 hours or more, e.g., 1 to 15 hours, or cooled to below about 100° F., after which it is heated to 180° to 250° F., e.g., 200° to 220° F., and held at said temperature for a sufficient period to crystallize the product and preferably to achieve maximum crystallinity, e.g., 24 to 200 hours or more, typically 50 to 100 hours. A crystalline hydrated sodium alumino-silicate zeolite having a faujasite structure is then separated from the aqueous mother liquor by decantation or filtration and washed to recover a crystalline product. After additional modification by cationic exchange as hereinafter described, it is calcined at temperatures up to about 1000° F. in order to remove the water of hydration.

As mentioned, the above procedure is utilized for the production of zeolites having the synthetic faujasite structure utilizing appropriate reactant mole ratios as described, for example, in U.S. Patent Nos. 2,882,244 and 3,013,988. By alteration of the reactant mole ratios, it may also be used for the preparation of zeolites having less preferred silica-to-alumina mole ratios of about 2.0. This type of zeolite is described, for example, in U.S. Patent No. 2,882,243 and designated therein as "Zeolite A." A somewhat altered procedure, performed at elevated temperature and pressure, may be used to produce zeolites having the synthetic mordenite structure as described, for example, in the Journal of the Chemical Society (1948), pp. 2158–2163.

It is known in the prior art to use the above-described crystalline zeolites as catalyst and catalyst supports in hydrocarbon conversion processes, e.g., catalytic cracking, hydrocracking, etc. These catalysts are, however, both too expensive and too active for use as the sole catalytic component in most hydrocarbon conversion processes. Several methods, designed to overcome these difficulties, have been taught in the prior art. For example, in U.S. Patent No. 3,325,397 there is disclosed a catalyst composition comprising a crystalline alumino-silicate zeolite embedded in a matrix of an inorganic oxide gel or clay. These catalysts are said to exhibit improved attrition resistance, activity, selectivity, and stability to deactivation by steam. Notwithstanding this apparent improvement, there remains a need for further improvement in these characteristics as well as in catalyst cost.

*Brief summary*

Accordingly, it is an object of this invention to provide an improved crystalline alumino-silicate zeolite catalyst composition for use in hydrocarbon conversion processes. Another object of this invention is to provide such a catalyst composition at a reduced cost, yet maintaining a high resistance to attrition, a high activity, a good selectivity for the production of desired products, and an improved resistance to deactivation by steam. Yet another object of this invention is to provide such a catalyst composition characterized by a superior combination of the aforementioned properties. Other objects will be apparent from the following description.

In accordance with this invention, the foregoing and other objects are accomplished with the catalyst composition comprising a crystalline alumino-silicate zeolite in admixture with a synthetic, amorphous silica-alumina component and a clay. The essence of the present invention resides in the discovery that a controlled amount of clay may be combined with the crystalline zeolite and the synthetic silica-alumina component without adversely affecting the resistance to attrition of the overall composition, its activity, its selectivity, or its resistance to deactivation by steam. In fact, it has been surprisingly discovered that with certain clays, one or more of these properties are improved. As is known in the prior art, the alkali metal content of the crystalline zeolite must be reduced. This may be accomplished either before or after the catalyst composition is prepared.

*Detailed description*

In general, the catalyst composition of the present invention will comprise from about 3 to 15 wt. percent of the crystalline alumino-silicate zeolite component. This component is embedded in, or admixed with, a matrix containing from about 1 to 50 wt. percent of a clay, the remainder being a silica-alumina hydrogel. In a preferred embodiment, the matrix will comprise 25 to 50 wt. percent of the clay and, in a most preferred embodiment, the clay may be combined with the crystalline zeolite and the percent. The catalyst may be prepared by any one of several methods which are hereinafter more fully described.

The crystalline alumino-silicate zeolite component of the present catalyst may be any one of those encompassed by the general formula set forth above. The zeolite component may be prepared by any of the methods known in the prior art. The preferred zeolite components will be those having a high silica-to-alumina mole ratio; i.e., those having a silica-to-alumina mole ratio greater than 3. This includes both synthetic and natural faujasite and mordenite. Synthetic faujasite is the most preferred zeolite species. In general, crystalline zeolites having uniform pore sizes ranging between 6 and 15 A. will be used in the catalysts of the present invention; however, the use of smaller pore size zeolites is contemplated. For use as a hydrocarbon conversion catalyst, it is necessary to reduce the alkali metal content of the crystalline alumino-silicate zeolites to a content of less than about 10 wt. percent, preferably less than about 6 wt. percent, e.g., 1 to 5 wt. percent, since alkali metal oxides will not promote the desired hydrocarbon conversion reactions. This reduction may be accomplished by methods well known in the art, e.g., ion exchange. The required reduction may be accomplished by exchange with any one or more of the metals selected from the group of the IB through Group VIII metals of the Periodic Table, and the hydrogen ion or ions capable of conversion to the hydrogen ion. The preferred cations are those selected from the group consisting of magnesium, calcium, and hydrogen. It will, however, be appreciated that mixtures of these and other ions may be used.

The clays which may be utilized in the practice of the present invention include bentonite, montmorillonite, halloysite, and kaolinite, and analogous degraded feldspars and felspathoid. The preferred clays for use in the present invention are a natural clay obtained from the Filtrol Corporation designated as "Filtrol SR-47" and kaolin. Kaolin is particularly preferred since it offers the twin advantages of being lowest in cost and exhibits the greatest synergistic coaction when combined in the catalyst of the present invention. In some cases, it will be necessary to leach the clay with acid to remove any residual alkali metals and other objectionable metals, such as iron and the like. Such leaching is well known in the prior art and will not be described herein. The synthetic, amorphous silica-alumina component may be any one of the conventional silica-alumina cracking catalysts used in the prior art. These materials are generally prepared as a cogel of silica and alumina. In general, silica will be present as the major component in such gels, being present in an amount ranging between about 55 to 100% by weight. Preferably, silica will be present in an amount ranging from about 75 to 90%, and a particularly preferred hydrogel comprises 87% silica and 13% alumina.

The catalyst of the present invention may be prepared by any one of several methods. For example, the desired form of the molecular sieve (either alone or in its mother liquor) is admixed with silica hydrosol and then an alum solution is added. A slurry of finely divided clay in the desired amount is then blended in with the composite an the total mixture is spray dried to form the catalyst composition particles. Alternatively, an unwashed, silica-alumina hydrogel can be mixed with a slurry of the desired form of the molecular sieve and the resulting composite then mixed with a slurry of clay. This final mixture is then subjected to a spray drying step as above to form the desired catalyst particles. Yet another method for preparing the catalyst in this invention comprises first mixing an unwashed silica-alumina hydrogel with a clay slurry and then admixing the composite with a slurry of the desired form of the molecular sieve. The total mixture is then spray dried as above. Still another method of preparation comprises the steps of first mixing the desired form of the crystalline zeolite with a slurry of clay and then combining with an unwashed silica-alumina hydrogel. The total mixture is then spray dried as before. As a fifth alternative method of preparation, the desired form of the crystalline zeolite (either alone or in its mother liquor) is first admixed with silica hydrogen and then a clay slurry is introduced; this is followed by the addition of aluminum sulfate. The total composite is then spray dried as above. The syray-dried material from any of the above procedures may then be subjected to a washing step, followed by a cation exchange step if the molecular sieve utilized above is in an undesirable form, e.g., the sodium form. The individual particle size of the various component will, largely, be dictated by convenience in the exact method of preparation. For example, the particle size must be sufficiently small to enable the preparation of a slurry if this method of preparation is chosen. Similarly, the particle sizes must be sufficiently small to enable spray drying. It will be appreciated that all methods of preparation will not yield identical products; e.g., impurities are more conveniently removed when the catalyst composition is washed after the spray-drying step. Nothwithstanding, the catalyst compositions of the present invention will exhibit improved properties when compared with the properties of a prior art catalyst prepared by an analogous process.

PREFERRED EMBODIMENT

The invention will be more apparent from the preferred embodiment and working examples which are set forth below.

In the preferred embodiment, the catalyst composition will comprise from about 5 to about 10 wt. percent of a synthetic faujasite, from about 25 to 50 wt. percent of a koalin clay, with the remainder being a silica-alumina hydrogel comprising about 87% silica and 13% alumina. In a most preferred embodiment, the faujasite will be present in an amount of about 5%, the kaolin clay will be present in an amount from about 32 to 40 wt. percent, and the remainder will be a silica-alumina hydrogel. The preferred method of preparation comprises the steps of first mixing a kaolin slurry with a slurry of sodium faujasite. This composite is then blended with a preformed, but unwashed, silica-alumina hydrogel. The material is then dried, preferably with conventional spray drying techniques. The dried material is then treated with a solution of $(NH_4)_2SO_4$ containing a small amount of $(NH_4)_2CO_3$ to reduce the sodium content of the crystalline zeolite. The catalyst composition is then steam activated at a temperature of about 1000° F. During this step, the ammonium ions are converted to the hydrogen form.

The preferred embodiment is illustrated by the following example:

EXAMPLE 1

219 grams kaolin (N.F. grade) equal to 190 grams dry basis were slurried in 750 cc. $H_2O$ and colloid milled. In a separate vessel, sodium faujasite equivalent to 25 grams hydrogen faujasite, were slurried in 150 cc. $H_2O$ and colloid milled. The two slurries were blended with 2400 grams of a preformed, but unwashed, 87% $SiO_2$–13% $Al_2O_3$ hydrogel (11.9 wt. percent solids), and the mixture colloid milled twice. This material was oven dried at about 250° F. and ground to a coarse powder. The material was slurried in 3 liters hot $H_2O$ for twenty minutes and suction filtered. The filter cake was treated (on the filter) with 6 x 500 cc. portions of hot 2% $(NH_4)_2SO_4$ solution containing 0.5% $(NH_4)_2CO_3$. The cake was removed from the filter and reslurried in three liters of fresh hot 2% ammonium sulfate-0.5% ammonium carbonate mixed solution for twenty minutes and suction filtered, washed with hot $H_2O$ and oven dried. The catalyst was heated sixteen hours at 1000° F. It comprised 5% hydrogen faujasite, 57%

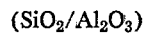

$(SiO_2/Al_2O_3)$

38% kaolin and its designated catalyst A is subsequent examples.

The invention is further illustrated by the following examples.

EXAMPLE 2

The catalyst of this example was prepared as follows: 190 grams Filtrol SR–47 (dry basis) were slurried in 750 cc. $H_2O$ passed through a colloid mill four times. In a separate vessel 25 grams ammonium—form faujasite (dry basis) were slurried in 150 cc. $H_2O$ and colloid milled. In a third vessel 2800 grams of a preformed, prewashed, 87% $SiO_2$-13% $Al_2O_3$ hydrogel (285 grams dry total weight) were blended with the slurry of SR–47 and the slurry of ammonium-faujasite and the mixture colloid milled twice to insure homogeneity. The blended material was oven dried and the dried material was ground to a powder and heated 16 hours at 1000° F. This catalyst comprised 5% hydrogen-faujasite, 57% silica-alumina, 38% SR–47 and is designated as Catalyst B in subsequent examples.

EXAMPLE 3

The catalyst of this example was prepared as follows: 219 grams kaolin (N.F. grade) equal to 190 grams dry basis were slurried in 750 cc. $H_2O$ and colloid milled four times. In a separate vessel 25 grams (dry basis) ammonium-form faujasite were slurried in 150 cc. $H_2O$ and colloid milled. In a third vessel, 2800 grams preformed, prewashed 87% silica-13% alumina-hydrogel (10.2% solids) were mixed with the kaolin and faujasite slurries. The mixture was colloid milled twice and oven dried. The catalyst was ground to a powder and calcined 16 hours at 1000° F. It comprised 5% hydrogen-faujasite, 57% silica-alumina and 38% kaolin and is designated as catalyst C in subsequent examples.

EXAMPLE 4

The catalyst of this example was prepared as follows: 190 grams acid-leached kaolin clay (dry basis) were slurried in 750 cc. $H_2O$ and colloid milled. In a separate vessel 25 grams (dry basis) ammonium-form faujasite were slurried in 150 cc. $H_2O$ and colloid milled. The two slurries were added with stirring to 3800 grams of a preformed, prewashed, 87% silica-13% alumina-hydrogel (10.2 wt. percent solids) and the mixture colloid milled twice. It was then oven dried at 250° F. The dried material was ground to a powder and calcined 16 hours at 1000° F. This catalyst comprised 5% hydrogen-faujasite, 57% silica-alumina and 38% kaolin (acid washed) and is designated catalyst D in subsequent examples.

EXAMPLE 5

The catalyst of this example was prepared as follows: In a 20-gal. vessel, slurry 2060 grams of kaolin (85.7% dry solids) in 10 liters water. To this were added 2 liters of a slurry comprising 315 grams of Na-faujasite (Y type). In a separate vessel, 34 kilograms of unwashed silica-alumina hydrogel (10.0% dry catalytic solids) were mixed with 25 liters of water. With stirring, the silica-alumina hydrogel was added to the clay faujasite slurry, the composite slurry colloid milled and then spray dried. The catalyst was washed with hot 2% ammonium sulfate solution to remove residual soluble ions, and rinsed with water. The cake was treated with rare earth chloride solution (1% dosage as $RE_2O_3$), rinsed with $H_2O$ and dried. This catalyst comprises 5% zeolite 32% kaolin, 63% silica-alumina gel and was designated catalyst E.

EXAMPLE 6

The catalyst of this example was made as follows: In a vessel slurry 5.45 kilograms of kaolin (86.7% dry solids) in 26 liters $H_2O$ and colloid milled the slurry. With stirring were added 10 liters of a slurry containing 840 g. Na-faujasite (Y type). In a separate vessel, 80 kilograms of unwashed silica-alumina hydrogel (10.2 wt. percent catalytic solids) were mixed with 57 liters $H_2O$. With stirring, the silica-alumina hydrogel was added to the clay-faujasite slurry and the composite slurry colloid milled and spray dried. The catalyst was washed, exchanged, and rare earth treated as described for catalyst E above. The catalyst comprises 5% zeolite, 35% kaolin, 60% silica-alumina gel and is designated catalyst F.

EXAMPLE 7

The catalyst of this example was made as follows: In a vessel, slurry 5.0 kilograms of kaolin (86.7% solids) in 41 liters $H_2O$. To this were added, with stirring, 644 grams Na-faujasite (Y type). In a separate vessel, 53 kilograms unwashed silica-alumina hydrogel (10.2 wt. percent catalytic solids) were blended with 36 liters H₂O and colloid milled. The silica-alumina hydrogel slurry was then added with stirring, to the clay-faujasite slurry, the composite slurry colloid milled and then spray dried. The catalyst was washed, exchanged, and rare earth treated as described above for catalyst E. This catalyst comprises 5% zeolite, 42% kaolin, 53% silica-alumina gel and is designated catalyst G.

EXAMPLE 8

The catalyst of this example was made as follows: In a vessel, slurry 4.12 kilograms koalin (86.7% solids) in 20 liters H₂O. With stirring were added 2 liters of a slurry containing 404 grams Na-faujasite (Y type). In a separate vessel, were blended 31.8 kilograms unwashed silica-alumina hydrogel (10.3 wt. percent catalytic solids) with 20 liters H₂O. The slurries were blended together and colloid milled. The composite slurry was spray dried. The catalyst was washed, exchanged, and rare earth treated as described above with catalyst E. This catalyst comprised 5% zeolite, 50% kaolin, 45% silica-alumina gel and is designated catalyst H.

EXAMPLE 9

The catalysts designated as A, B, C, D, E, F, G and H in the foregoing examples were each steamed at atmospheric pressure and 1500° F. for 16 hours. These catalysts were then tested in a cracking operation at 950° F. using a 500–700° F. virgin gas oil with a two-minute process period. The following data compare activity and product distributions for each of these catalysts at the 60 wt. percent conversion level.

TABLE I

| Catalyst | A | B | C | D |
|---|---|---|---|---|
| W./hr./w. at 60% conv | 2.6 | 2.3 | 1.6 | 1.9 |
| Carbon, wt. percent | 0.8 | 1.2 | 1.2 | 1.7 |
| C₃–gas, wt. percent | 7.1 | 8.7 | 8.4 | 7.8 |
| Total C₄, wt. percent | 9.3 | 12.7 | 11.4 | 10.9 |
| C₅/430° F. naphtha, wt. percent | 42.8 | 37.4 | 39.0 | 39.6 |

| Catalyst | E | F | G | H |
|---|---|---|---|---|
| W./hr./w | 3.8 | 4.0 | 3.7 | 0.4 |
| Carbon, wt. percent | 0.6 | 1.0 | 0.5 | 6.5 |
| C₃–gas, wt. percent | 6.5 | 5.6 | 6.2 | 10.7 |
| Total C₄, wt. percent | 9.6 | 8.9 | 9.8 | 16.0 |
| C₅/430° F. wt. percent | 43.3 | 44.5 | 43.5 | 26.8 |

EXAMPLE 10

To further illustrate the utility of the present invention, the catalyst designated as A in Example 1 was steamed at atmospheric pressure and 1400° F. for 16 hours. The catalyst was then tested in a cracking operation at 950° F. using a 500–700° F. virgin gas oil with a two-minute process period in the same manner as in Example 9. The data set forth in the table below reflect the properties of this catalyst after activation at these conditions.

Table II

Catalyst: A
- W./Hr./w. @ 60% conv. ———————— 4.6
- Carbon, wt. percent ———————————— 0.7
- C₅%/430° F. Naphtha, wt. percent ———— 41.7

In order to compare the results obtained with the mixed matrix catalysts of the present invention with single matrix material catalysts prepared in accordance with prior art methods, the following examples are presented.

EXAMPLE 11

The catalyst of this example is a prior art catalyst and was prepared as follows: 110 grams kaolin (N.F. grade; 86.2% dry solids) were dry mixed with 6.5 grams oven dried ammonium-form faujasite (5.0 grams dry solids) and then slurried in 300 cc. H₂O. The slurry was passed through a colloid mill four times and then placed in an oven at 250° F. to dry. The oven dried granules were broken up and then heated 16 hours at 1000° F. This prior art catalyst is designated as catalyst J in subsequent examples and comprises (after calcining) 5% hydrogen-faujasite and 95% kaolin.

EXAMPLE 12

The catalyst of this example is a catalyst comprising 5% hydrogen-faujasite imbedded in a matrix of 95% (13% Al₂O₃-87% SiO₂) hydrogel. The catalyst is designated as catalyst K in the subsequent examples and is a prior art catalyst.

EXAMPLE 13

The catalyst of this example is a prior art catalyst and was made as follows: 98 grams Filtrol SR–47 clay (equivalent to 95 grams dry basis) were dry mixed with 6.5 grams oven dried ammonium-form faujasite (5.0 grams dry) and then slurried in 300 cc. H₂O. The slurry was passed through a colloid mill four times and then oven dried at 250° F. The oven dried granules were broken up and then heated 16 hours at 1000° F. This catalyst is designated as catalyst L in subsequent examples and comprises (after calcining) 5% hydrogen-faujasite and 95% SR–47 clay.

EXAMPLE 14

The prior art catalysts designated as J, K and L from Examples 11–13 were each steamed at atmospheric pressure and 1500° F. for 16 hours. Each of these catalysts was then tested in a cracking operation at 950° F. using a 500–700° F. virgin gas oil with a two-minute process period in a manner set forth in Examples 9 and 10. The data set forth in the table below compare activity and product distribution for each of these catalysts at the 60 wt. percent conversion level.

TABLE III

| Catalyst | J | K | L |
|---|---|---|---|
| W./hr./w. at 60% conv | 1.6 | 2.4 | 0.8 |
| Carbon, wt. percent | 1.6 | 1.3 | 6.2 |
| C₅/430° F. naphtha, wt. percent | 40.6 | 39.1 | 29.3 |

EXAMPLE 15

In this example, the prior art catalysts designated as K and L from Examples 12–13 were each steamed at atmospheric pressure and 1400° F. for 16 hours. Each of these catalysts was then tested in a cracking operation at 950° F. using a 500–700° F. virgin gas oil with a two-minute process period in the manner set forth in Examples 9, 10 and 14. The data set forth in the table below compare activity and product distribution for each of these catalysts at the 60 wt. percent conversion level.

TABLE IV

| Catalyst | K | L |
|---|---|---|
| W./hr./w. at 60% conv | 3.7 | 1.5 |
| Carbon, wt. percent | 1.4 | 3.7 |
| C₅/430° F. naphtha, wt. percent | 37.7 | 35.5 |

EXAMPLE 16

In this example, a series of tests, designed to establish the relative attrition rate of spray-dried, microspherical analogs of the same nominal composition as the catalysts designated as E, F, G, J, K and A described in the examples above was completed. These tests consisted of first subjecting the catalysts to a temperature of 1000° F. for six hours in ambient air. The catalyst was then cooled and a weighed amount placed in a vessel and air, at a constant flow rate, was used to fluidized the bed for four hours. The fines produced by attrition during one-hour intervals were collected, weighed; the percent per hour fines produced during the hours 1–4 were averaged and the attrition rate reported on this basis.

The results of this series of tests are set forth below in Table V.

TABLE V

| Catalyst (spray-dried counterpart) | J | K | A |
|---|---|---|---|
| Attrition, wt. percent per hour | 13.4 | 3.6 | 3.2 |
| Catalyst | E | F | G |
| Attrition rate, percent hr | 4.2 | 3.2 | 17 |

It will be apparent from the foregoing examples, that the catalyst compositions of the present invention exhibit a desirable combination of (1) resistance to attrition, (2) selectivity, (3) activity, and (4) resistance to steam activation. For example, it can be seen from a comparison of the data set forth in Tables I and III, that the catalyst containing Filtrol clay (designated as B) is 28% more active; that the carbon yield is only one-third and that the selectivity for $C_5/430°$ F. naphtha is as good, or better, than would be predicted from a consideration of its relative composition based on the prior art catalyst. In a similar manner, a comparison of the data set forth in Tables III and IV indicate that the catalyst designated as A is about 10% more active; yields 30% less carbon and results in a yield of $C_5/430°$ F. product as good, or better, than would be predicted from a consideration of its relative composition based on the prior art catalyst. Similarly, this same catalyst can be seen to exhibit even more improved properties after steaming at 1500° F. Further, the data set forth in Table V show that the addition of clay to the catalyst composition has no adverse effect on its resistance to attrition.

Having thus described and illustrated the invention what is claimed is:

1. An improved hydrocarbon conversion catalyst composition consisting essentially of from 3 to 15 wt. percent of a crystalline alumino-silicate zeolite, said zeolite having been cation exchanged so as to reduce its alkali metal oxide content to substantially less than about 10 wt. percent, said zeolite further being imbedded in a mixed matrix consisting of from about 1 to 50 wt. percent clay admixed with from about 96 to 35 wt. percent silica-alumina hydrogel, the materials forming said matrix having substantially inferior catalytic properties to said zeolite.

2. The catalyst composition of claim 1 wherein said crystalline alumino-silicate zeolite is a synthetic faujasite which has been cation exchanged to the magnesium form.

3. The catalyst composition of claim 1 wherein said crystalline alumino-silicate zeolite is a synthetic faujasite cation exchanged to the hydrogen form.

4. The catalyst composition of claim 1 wherein said crystalline alumino-silicate zeolite is a synthetic faujasite which has been cation exchanged to the calcium form.

5. The catalyst composition of claim 1 wherein said clay comprises kaolin.

6. The catalyst composition of claim 1 wherein said silica-alumina hydrogel contains 87% silica-13% alumina.

7. The catalyst composition of claim 1 wherein said crystalline alumino-silicate zeolite comprises a synthetic faujasite which has been exchanged so as to reduce its alkali metal oxide content to substantially less than 10 wt. percent with a cation selected from the group consisting of hydrogen, magnesium, calcium or mixtures thereof.

8. An improved hydrocarbon conversion catalyst composition comprising from 3–15 wt. percent of a crystalline alumino-silicate zeolite, said zeolite having been cation exchanged so as to reduce its alkali metal oxide content to substantially less than about 10 wt. percent, said zeolite further being imbedded in a mixed matrix consisting of from about 25–50 wt. percent clay admixed with from about 72–35 wt. percent silica-alumina hydrogel.

9. The catalyst composition of claim 8 wherein said crystalline alumino-silicate zeolite is a synthetic faujasite which has been cation exchanged to the magnesium form.

10. The catalyst composition of claim 8 wherein said crystalline alumino-silicate zeolite is a synthetic faujasite cation exchanged to the hydrogen form.

11. The catalyst composition of claim 8 wherein said crystalline alumino-silicate zeolite is a synthetic faujasite which has been cation exchanged to the calcium form.

12. The catalyst composition of claim 8 wherein said clay comprises kaolin.

13. The catalyst composition of claim 8 wherein said silica-alumina hydrogel contains 87% silica-13% alumina.

14. The catalyst composition of claim 8 wherein said crystalline alumino-silicate zeolite comprises a synthetic faujasite which has been exchanged so as to reduce its alkali metal oxide content to substantially less than 10 wt. percent with a cation selected from the group consisting of hydrogen, magnesium, calcium or mixtures thereof.

15. An improved hydrocarbon conversion catalyst composition comprising from 3 to 15 wt. percent of a crystalline alumino-silicate zeolite, said zeolite having been cation exchanged so as to reduce its alkali metal oxide content to substantially less than about 10 wt. percent, said zeolite further being imbedded in a mixed matrix consisting of from about 32 to 40 wt. percent clay admixed with from about 65 to 45 wt. percent silica-alumina hydrogel.

16. The catalyst composition of claim 5 wherein said clay comprises kaolin.

17. The catalyst composition of claim 15 wherein said crystalline alumino-silicate zeolite comprises a synthetic faujasite which has been exchanged so as to reduce its alkali metal oxide content to substantially less than 10 wt. percent with a cation selected from the group consisting of hydrogen, magnesium, calcium or mixtures thereof.

References Cited
UNITED STATES PATENTS

| 3,210,267 | 10/1965 | Plank et al. | 252—455 X |
| 3,325,397 | 6/1967 | Plank et al. | 252—455 X |
| 3,337,474 | 8/1967 | Cornelius et al. | 252—455 |

DANIEL E. WYMAN, *Primary Examiner.*

C. F. DEES, *Assistant Examiner.*

U.S. Cl. X.R.
208—120; 252—457